United States Patent
Kim et al.

(10) Patent No.: US 7,651,812 B2
(45) Date of Patent: Jan. 26, 2010

(54) RECHARGEABLE BATTERY MODULE

(75) Inventors: Tae-Yong Kim, Suwon-si (KR);
Gun-Goo Lee, Suwon-si (KR);
Yoon-Cheol Jeon, Suwon-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 283 days.

(21) Appl. No.: 11/362,222

(22) Filed: Feb. 27, 2006

(65) Prior Publication Data
US 2006/0202661 A1     Sep. 14, 2006

(30) Foreign Application Priority Data
Mar. 11, 2005    (KR) .............. 10-2005-0020527

(51) Int. Cl.
*H01M 2/10* (2006.01)
(52) U.S. Cl. .................. 429/100; 429/99; 320/107
(58) Field of Classification Search .............. 320/107; 429/99–100
See application file for complete search history.

(56) References Cited

U.S. PATENT DOCUMENTS 4,662,698 A * 5/1987 Olsson .................. 439/395
6,555,264 B1 * 4/2003 Hamada et al. ............ 429/156

FOREIGN PATENT DOCUMENTS

| JP | 61-171058 | 8/1986 |
|----|-----------|--------|
| JP | 2000-200592 | 7/2000 |
| JP | 2001-035548 | 2/2001 |
| JP | 2003-323871 | 11/2003 |
| JP | 2004-235110 | 8/2004 |

* cited by examiner

*Primary Examiner*—Patrick J Assouad
*Assistant Examiner*—Samuel Berhanu
(74) *Attorney, Agent, or Firm*—Robert E. Bushnell, Esq.

(57) ABSTRACT

A rechargeable battery module includes a plurality of unit batteries disposed apart at predetermined intervals and barriers interposed therebetween. The barriers include a plurality of protrusions and a plurality of plates with at least one junction portion. The junction portion on one plate is fixed to another plate opposing the one plate.

15 Claims, 8 Drawing Sheets

50

RECHARGEABLE BATTERY MODULE

CLAIM OF PRIORITY

This application makes reference to, incorporates the same herein, and claims all benefits accruing under 35 U.S.C. §119 from an application for SECONDARY BATTERY MODULE AND WALL OF SECONDARY BATTERY MODULE earlier filed in the Korean Intellectual Property Office on 11 Mar. 2005 and there duly assigned Serial No. 10-2005-0020527.

BACKGROUND OF THE INVENTION

1. Field of the Invention

The present invention relates to a rechargeable battery module, and more particularly, to a rechargeable battery module having a plurality of unit batteries and interposed barriers.

2. Description of the Related Art

Unlike a primary battery, the rechargeable battery may be recharged. Lower power batteries are used for various portable electronic devices such as cellular phones, laptop computers, and camcorders. Bulk size batteries are used as the power source for motor drive, such as in hybrid electric vehicles.

Depending on the external shape, rechargeable batteries may be classified into different types, for example, prismatic and cylindrical batteries. When they are used for motor drive of the machines requiring a high power source such as the hybrid electric vehicles, the rechargeable batteries may form a rechargeable battery module of high power.

The rechargeable battery module is formed by serially connecting several rechargeable batteries (hereinafter "unit batteries"), and each of the unit batteries includes an electrode assembly in which a separator is interposed between a positive electrode and a negative electrode. The electrode assembly is inserted inside a case, and a cap assembly is assembled with the case to seal the case. The cap assembly can include terminals disposed extending from the inside to the outside of the case and electrically connected to the positive electrode and the negative electrode, respectively.

If the unit batteries are prismatic type batteries, the unit batteries are arranged to alternate positive and negative terminals of one unit battery projected from the upper portion of the cap assembly with the positive and negative terminals of an adjacent unit battery. Adaptors of the electric conductor are typically mounted on the threaded negative and positive terminals such that they are electrically connected with each other to form the battery module.

Since the battery module connects several to tens of unit batteries to form one battery module, there is a need to efficiently dissipate heat generated from each unit battery. In particular, when the unit battery is used as bulk size rechargeable batteries for motor drive such as in electric vehicles, hybrid electric vehicles, motor scooters, and vacuum cleaners, the heat dissipation is of significant importance.

If the heat dissipation does not occur properly in the battery module, the temperature of the battery module may excessively increase due to the heat generated from each unit battery, and accordingly, not only the battery module but also the machines with the battery module, can malfunction.

Accordingly, when forming the battery module, a barrier is disposed between unit batteries, and the space between unit batteries formed by the barrier is used not only for cooling unit batteries but also for preventing distortion due to heat expansion of the unit batteries.

To perform such functions, the barrier needs sufficient strength, and structure for efficient heat dissipation.

However, the barriers in the conventional rechargeable battery module do not satisfy the above two conditions simultaneously so there is difficulty in forming rechargeable battery modules of the quality which consumers expect.

That is, if the barriers ensure the sufficient strength, its manufacturing cost is increased and there is restriction in designing a passage of cooling air. Alternatively, if the barriers are formed having high cooling efficiency, they tend to exhibit structural weakness.

Furthermore, the barrier has to be manufactured using a die casting method rather than an injection molding method so as to ensure an improved strength. The barriers fabricated using the die casting method are hard to weld to cause difficulty of a rechargeable battery module constitution.

SUMMARY OF THE INVENTION

An embodiment of the present invention provides a rechargeable battery module including a barrier which has sufficient strength for maintaining a unit battery shape and can efficiently control the unit battery temperature.

Another embodiment of the present invention provides a rechargeable battery module including a barrier which can improve welding.

According to an embodiment of the present invention, a battery module is provided including: a plurality of unit batteries disposed apart at intervals; and a plurality of barriers interposed between the unit batteries, each barrier including a plurality of plates having a plurality of protrusions and at least one junction portion. The junction portion on one plate is fixed to another plate opposing the one plate.

The protrusions on the plurality of plates are preferably arranged to face each other. The plurality of plates are preferably welded together. The plurality of plates are preferably welded together where the junction portions of one plate are closely adjacent to junction faces on another plate. The plurality of plates are preferably welded together by either ultrasonic welding or laser welding.

The junction portions preferably protrude at predetermined intervals on each plate. At least one of the protrusions or the junction portions are preferably solid. At least one of the protrusions or the junction portions are alternatively preferably hollow. The junction portions are preferably taller than the protrusions. Each plate preferably has a quadrangular shape, and the junction portions are preferably arranged at one end of each plate.

A holder supporting the junction portion on one plate is preferably arranged along junction faces on another plate, the holder being adapted to contact the junction portion.

At least one of the protrusions or the junction portions preferably has a conical shape with a cutaway apex area that is wide at the top and narrow at the bottom. Each junction portion preferably includes a rib disposed at both ends of the plates with the protrusions in the middle. Each barrier preferably includes an assembly having a plurality of welded plates, the junction portions of the plates being closely adjacent to each other.

BRIEF DESCRIPTION OF THE DRAWINGS

A more complete appreciation of the present invention and many of the attendant advantages thereof will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which exemplary embodiments of the present invention are shown.

Figure 1:
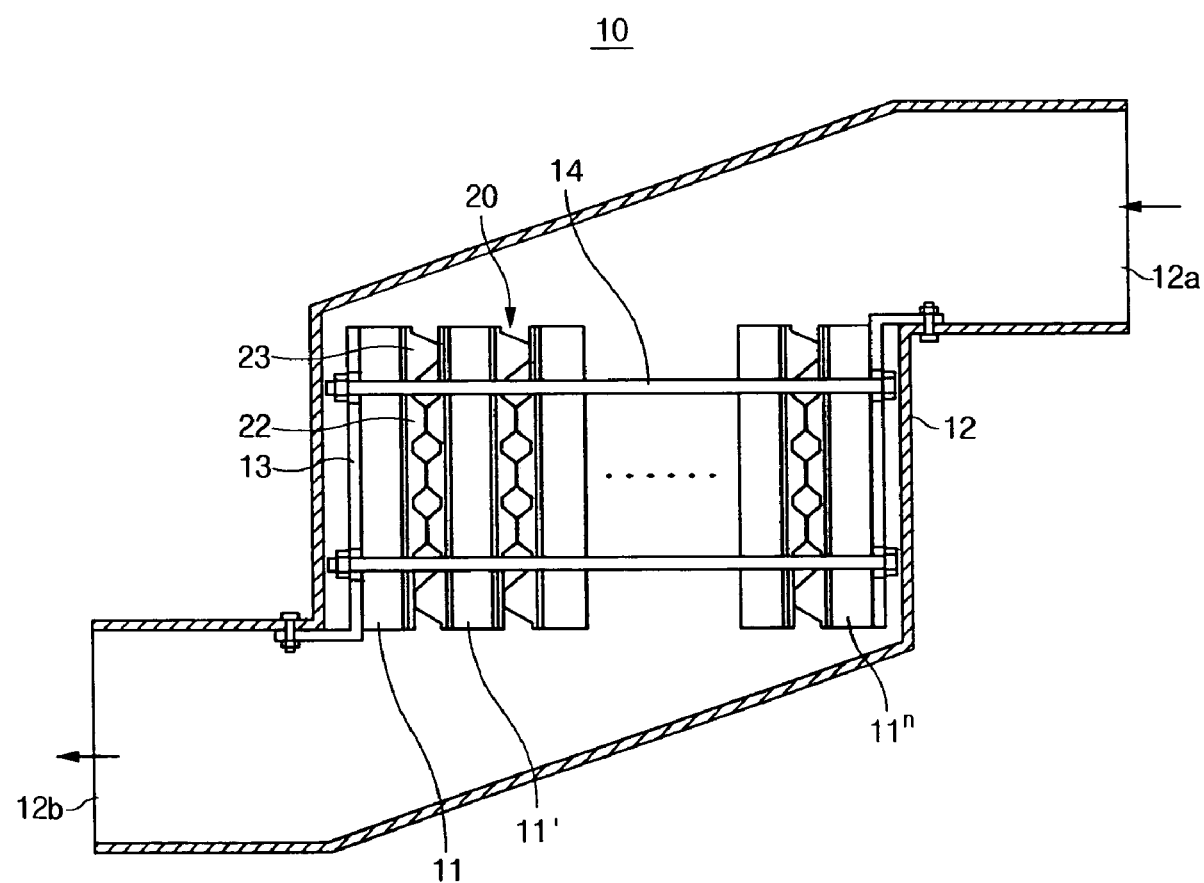
FIG. 1 is a cross-sectional side view of a rechargeable battery module according to a first embodiment of the present invention.

FIG. 1 is a cross-sectional side view of a rechargeable battery module according to a first embodiment of the present invention.

Referring to FIG. 1, a rechargeable battery module 10 according to the present embodiment includes a plurality of unit batteries 11, $11^1$ ... $11^n$ spaced predetermined intervals apart from one another.

The unit battery 11 in the present embodiment is a prismatic type rechargeable battery which includes a case, an electrode assembly including a positive electrode, a negative electrode, and a separator to be inserted into the case, and a cap assembly disposed within the case.

Barriers 20 are disposed between the unit batteries 11, $11^1$ ... $11^n$ to allow a coolant (e.g., air in the present embodiment) to flow between the unit batteries 11, $11^1$ ... $11^n$. The barriers 20 are attached to the unit batteries 11, $11^1$ ... $11^n$ to support them.

Such unit batteries 11, $11^1$ ... $11^n$ and the barriers 20 can be attached by a fastener, that is, by end plates 13 disposed at both of the outermost sides of a unit battery aggregate comprised of the unit batteries 11, $11^1$ ... $11^n$ and the barriers 20, and restraint rods 14 combined with the end plates 13 by a screw thread to fix the unit batteries 11, $11^1$ ... $11^n$ and the barriers 20, to thereby form an assembly.

The assembly is mounted in a housing 12 having an inlet 12a for receiving air and an outlet 12b for discharging the air which cools the unit batteries 11, $11^1$ ... $11^n$.

The assembly is installed in the housing 12 by detachably fixing the end plates 13 to the housing 12 with screws and nuts, for example.

The inlet 12a is disposed on one side of the upper portion of the housing 12, and the outlet 12b is disposed on one side of the lower portion of the housing 12a arranged opposite to the inlet 12a. However, such a structure of the housing 12a is only one example of the rechargeable battery modules that the present invention can adopt, and the present invention is not limited thereto.

Such a rechargeable battery module 10 enables the incoming air entering the housing 12 through the inlet 12a of the housing 12 to flow from the upper portion to the lower portion of the housing 12 and to exit outside the housing 12 through the outlet 12b of the housing 12.

During this process, the air passes through the barriers 20, and the heat generated by the unit batteries 11, $11^1$ ... $11^n$ is heat-exchanged by the air, which can cool them.

According to this embodiment of the present invention, the barrier 20 is formed by assembling two plates 21 and 21', which have the same size as a side of the unit batteries 11, $11^1$ ... $11^n$.

Each plate 21 and 21' has a plurality of protrusions 22 and 22', which are supposed to contact each other when the plates 21 and 21' is disposed to face each other.

Figure 2:
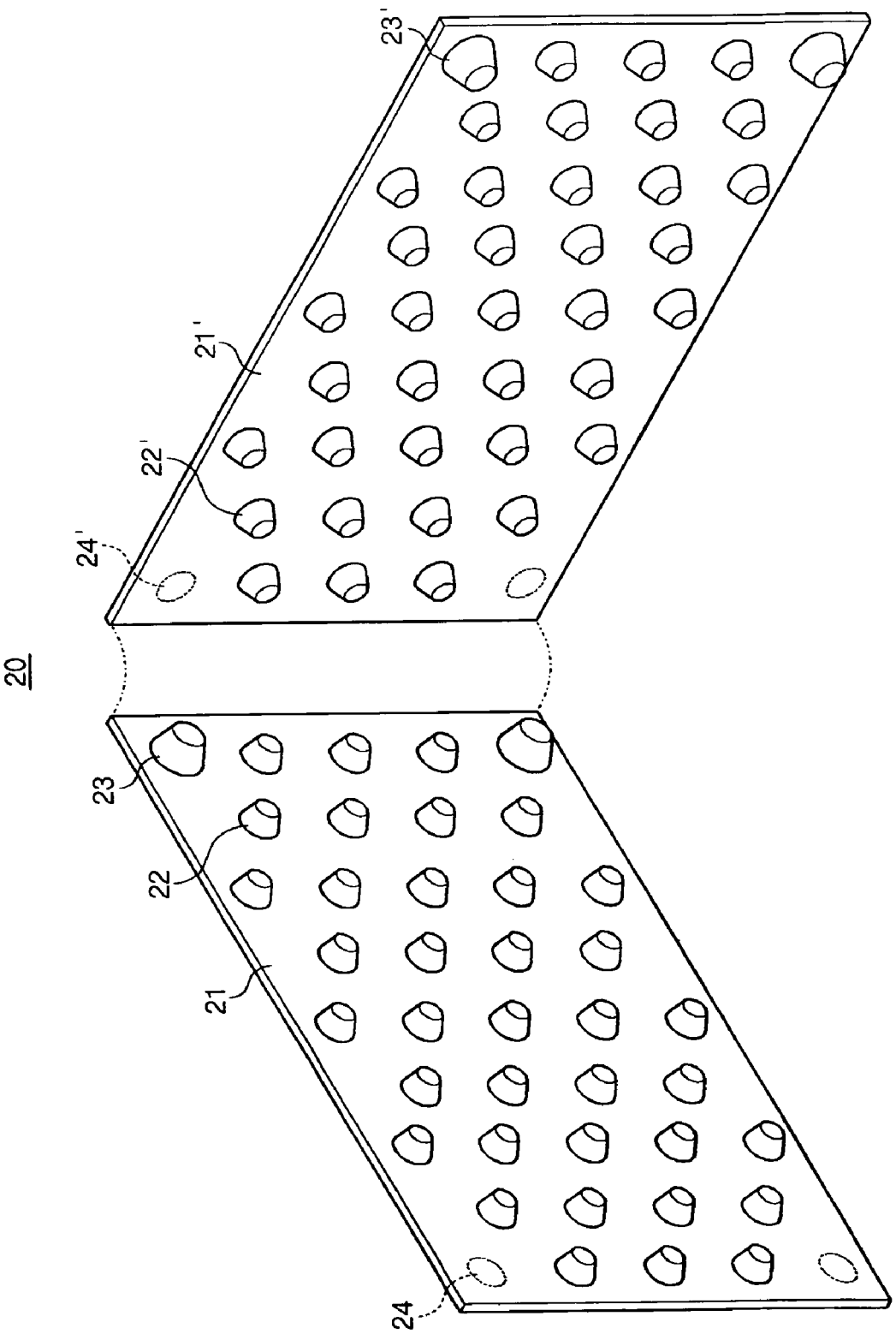
FIG. 2 is a perspective view of a barrier of a battery module according to the first embodiment of the present invention.

Referring to FIG. 2, the barrier 20 is described in more detail.

As shown in FIG. 2, the plates 21 and 21' forming the barrier 20 have a plurality of protrusions 22 and 22' spaced apart at predetermined intervals. The protrusions 22 and 22' have a predetermined height.

In addition, the plates 21 and 21' have junction portions 23 and 23' at their corners which are taller than the protrusions 22 and 22' (about twice as tall).

In this embodiment, the junction portions 23 and 23' protrude in the same direction as the protrusions 22 and 22' and formed at either ends of the plates 21 and 21'.

In addition, the junction portions 23 and 23' in two different plates 21 and 21' are disposed not to face each other but to face junction faces 24 and 24' in the other plate when the plate 21 and 21' are disposed to face each other. That is, the junction portions 23 in one plate 21 should be closely adjacent to junction faces 24 on the other plate 21', and the other junction portions 23' should also closely adjacent to junction faces 24 on the plate 21.

In this way, when the two plates 21 and 21' are closely adjacent with the protrusions 22 and 22' and also, the junction portions 23 and 23' and the junction faces 24 and 24' facing each other, the protrusions 22 and 22' respectively formed in two different plates are closely adjacent to each other, and the junction portions 23 and 23' are also closely adjacent to the junction faces 24 and 24' respectively formed on the other facing plate.

Then, the junction portions 23 and 23' are welded to the junction faces 24 and 24', completing the barrier 20.

The welding can include ultrasonic welding or laser welding. However, ultrasonic welding is adopted in this embodiment of the present invention.

Figure 3:
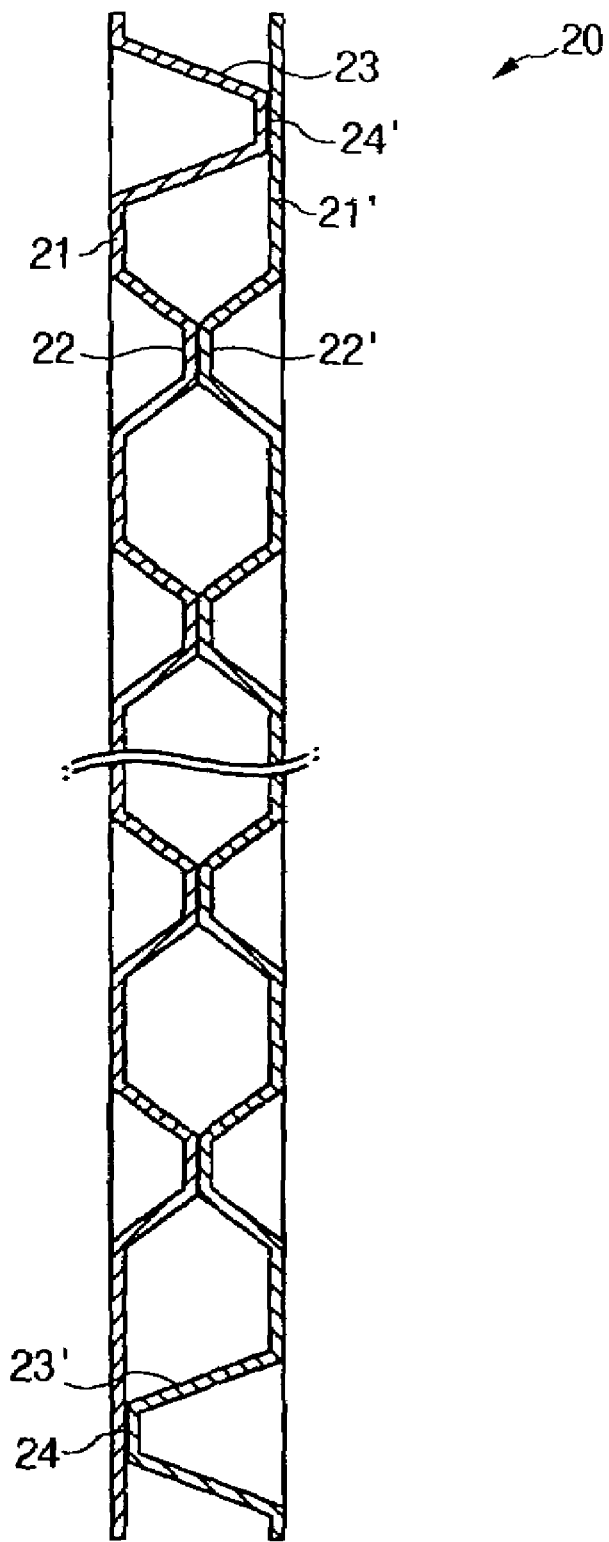
FIG. 3 is a cross-sectional view of the barrier of FIG. 2.

In this embodiment, the protrusions 22 and 22' and the junction portions 23 and 23' have internal hollow spaces as shown in FIG. 3. A mother plate which is composed of the plates 21 and 21', the protrusions 22 and 22', and the junction portions 23 and 23' preferably have a thickness ranging from 0.2 to 1 mm. When the barrier 20 is formed of the mother plate, it can be strong enough to be formed in a predetermined shape.

Figure 4:
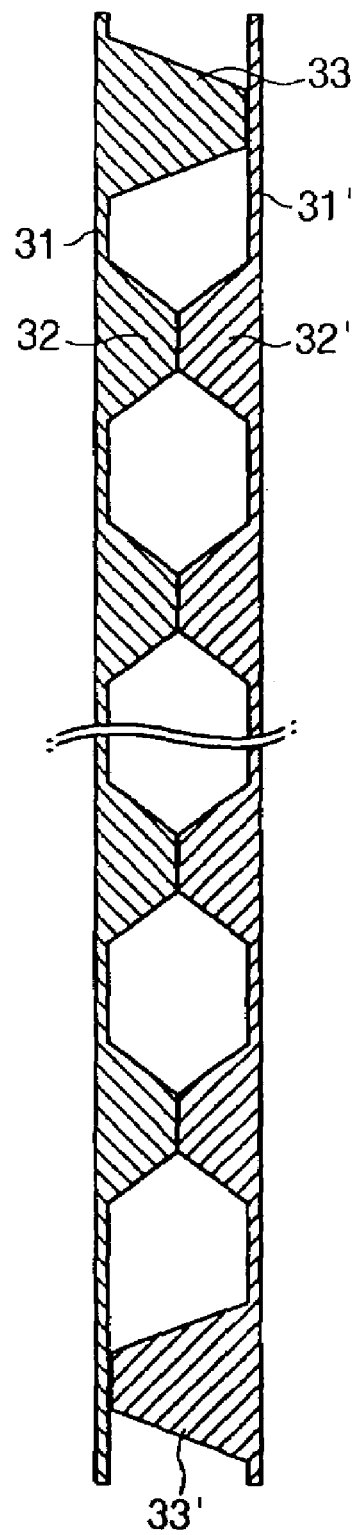
FIG. 4 is a cross-sectional view of a barrier of a rechargeable battery module according to a second embodiment of the present invention.

In this embodiment, the barrier 20 can have another structure that protrusions 32 and 32' and joint members 33 and 33' are solid as shown in FIG. 4 rather than the above hollow structure. These protrusions 32 and 32' and joint members 33 and 33' can be formed of the same material as the plates 31 and 31'.

When plates 21 and 21' are joined together, the junction portions 23 and 23' and the junction faces 24 and 24', which have a different thickness, are joined together by ultrasonic welding. Since the ultrasonic welding easily works for two different objects with a different thickness, the two plates 21 and 21' can be firmly joined together.

The barrier 20 with the above structure can have internal spaces among the closely-adjacent protrusions 22 and 22', which can form a passage for a coolant when the cells 20 are interposed between the unit batteries 11, 11$^1$ ... 11$^n$ to form a rechargeable battery module 10.

In this embodiment, the protrusions 22 and 22' can have a conical shape with a cutaway apex area that are wide at the top and narrow at the bottom, and so can the junction portions 23 and 23'.

Likewise, the junction portions 23 and 23' can have various shapes. However, the junction portions 23 and 23' must have a minimum area on their tips to allow welding to the junction faces 24 and 24'.

Figure 5:
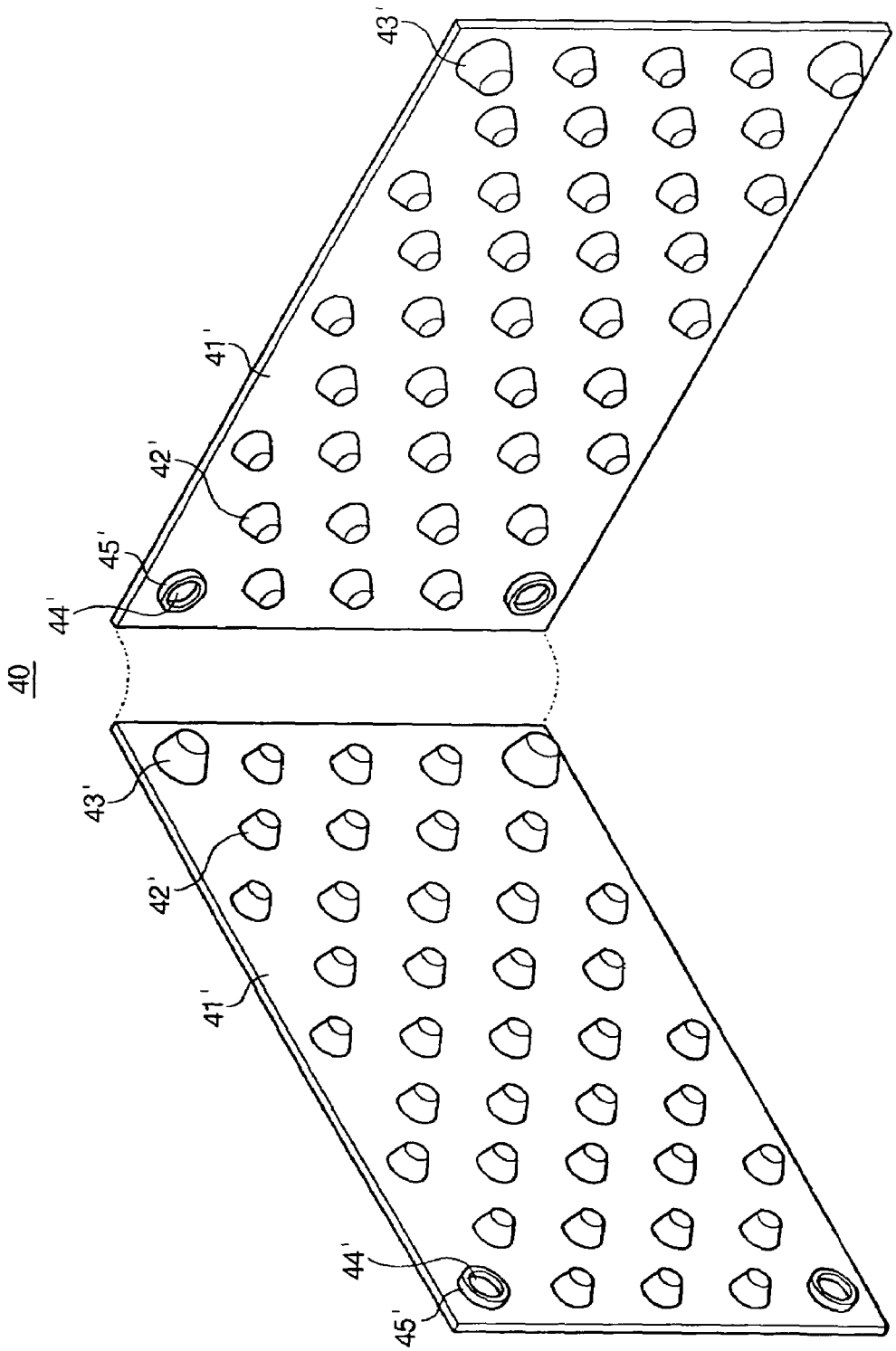
FIG. 5 is an exploded perspective view of a barrier of a rechargeable battery module according to a third embodiment of the present invention.
Figure 6:
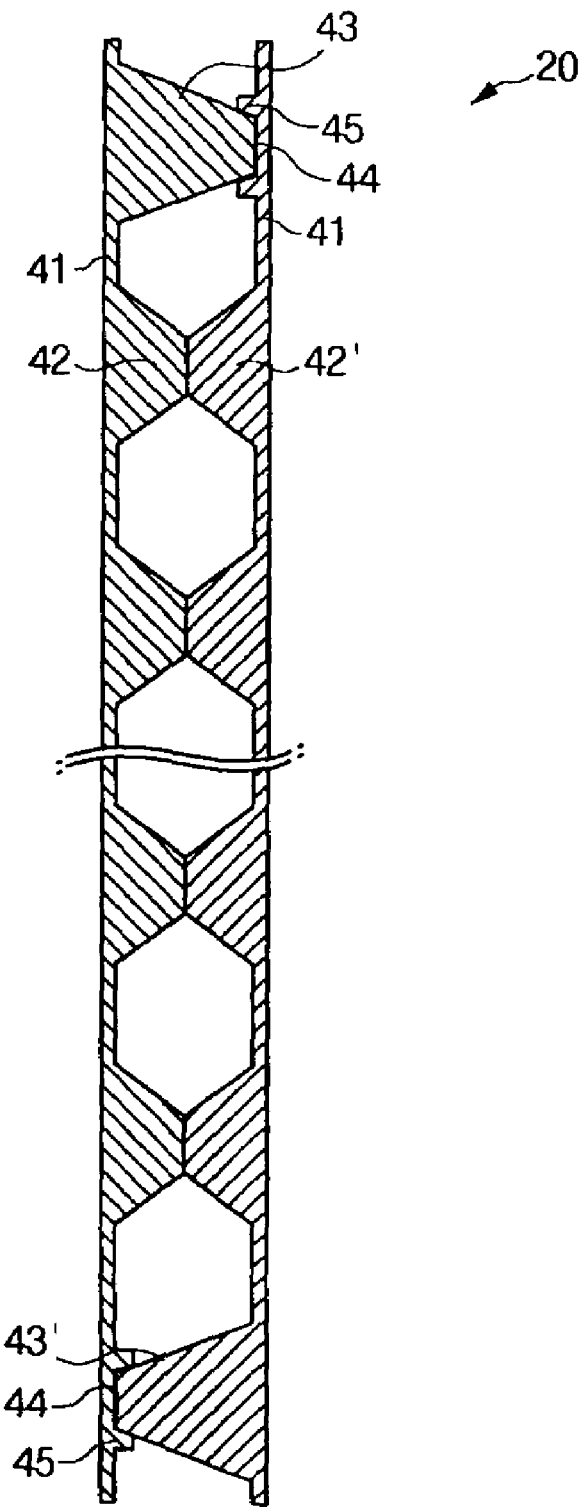
FIG. 6 is a cross-sectional view of the barrier of FIG. 5.

FIGS. 5 and 6 are a perspective view and a planar cross-sectional view of a barrier 40 according to another embodiment of the present invention.

According to the drawing, the barrier 40 includes two plates 41 and 41' formed in the same way as in the aforementioned embodiment. Each plate 41 and 41' respectively has a plurality of protrusions 42 and 42' and junction portions 43 and 43'. The plates 41 and 41' are assembled in the same way as in the aforementioned embodiment.

However, according to this embodiment of the present invention, the barrier 40 additionally includes holders 45 and 45' along the junction faces 44 and 44', which are closely adjacent to the junction portions 43 and 43'.

These holders 45 and 45' play a role of facilitating the junction portions 43 and 43' to match with the junction faces 44 and 44' and well maintaining their adjacency state.

According to this embodiment of the present invention, the holders 45 and 45' are formed as rings, but their shape is not limited thereto and they can have various shapes, depending on the shape of the junction portions 43 and 43'.

Since the barrier 40 is formed by assembling the two plates 41 and 41' in which the protrusions 42 and 42' face each other, the holders 45 and 45' can support the junction portions 43 and 43', helping them to be closely adjacent to the junction faces 44 and 44' (refer to FIG. 6).

Since the holders 45 and 45' can regulate where the junction portions 43 and 43' are fixed, they can help the two plates 21 and 21' to be more exactly and firmly fixed.

Figure 7:
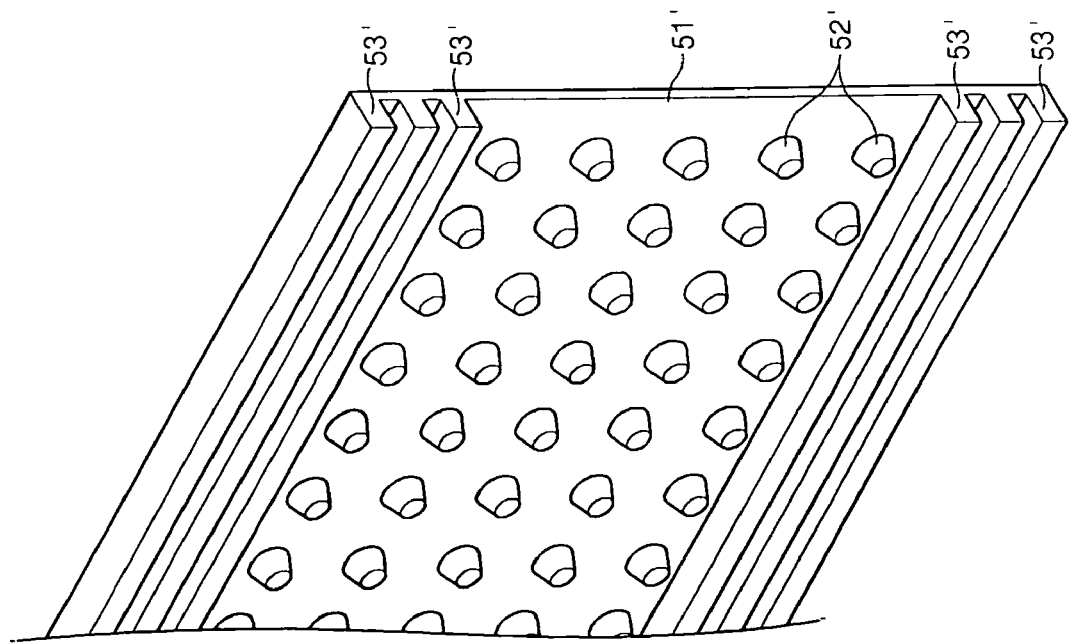
FIG. 7 is an exploded perspective view of a barrier of a battery module according to a forth embodiment of the present invention.
Figure 7:
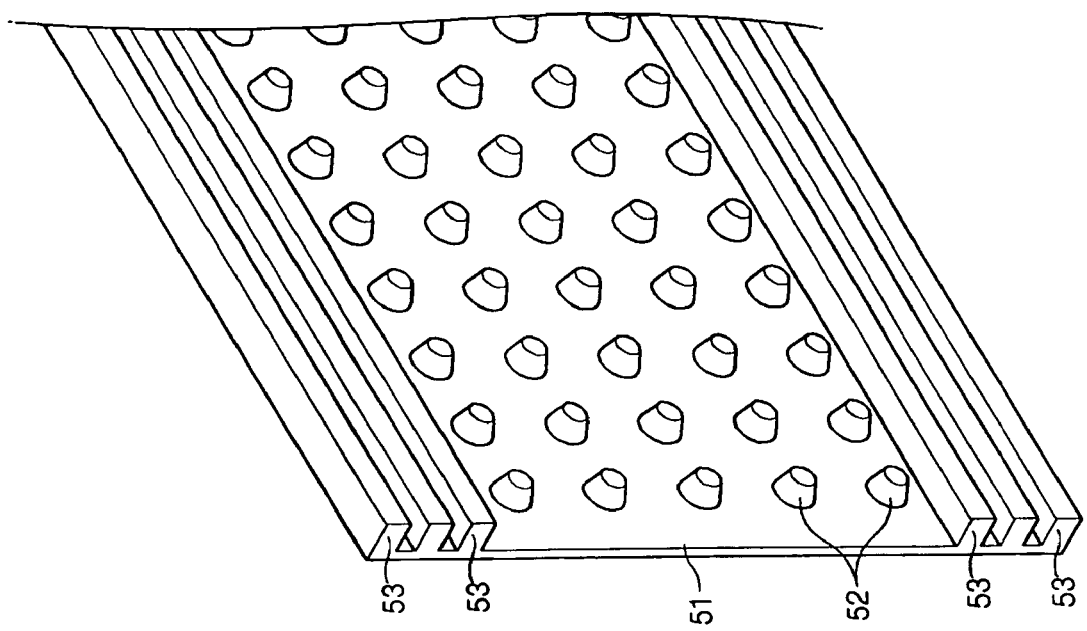
Figure 8:
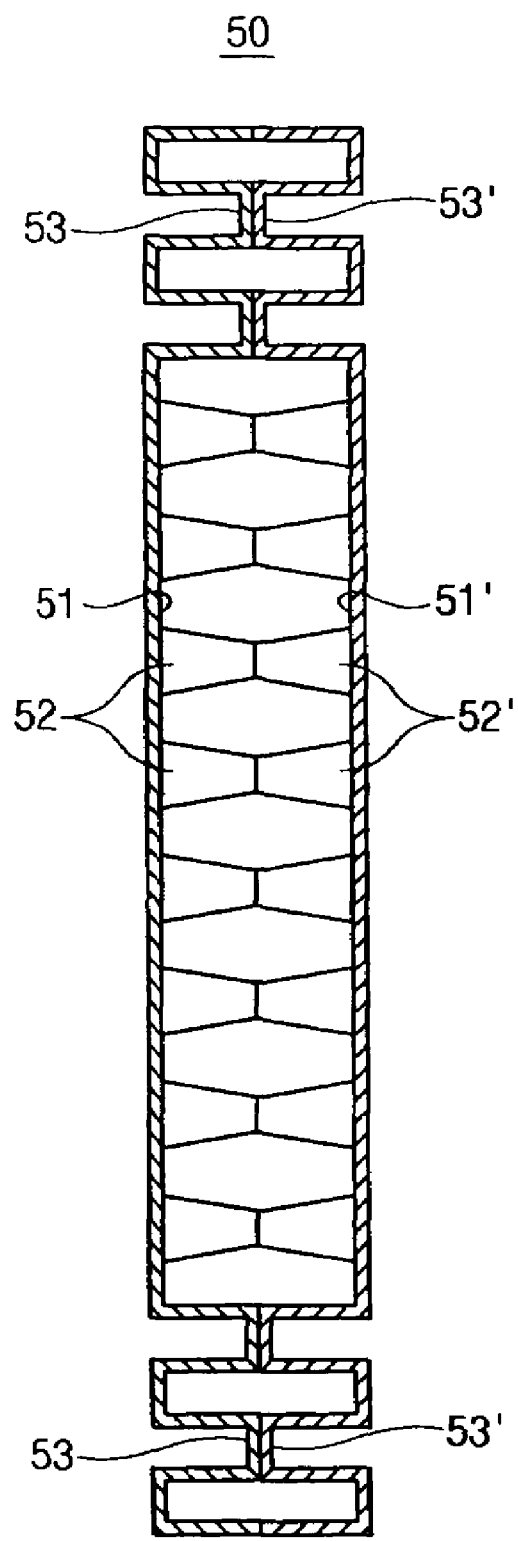
FIG. 8 is a cross-sectional view of the barrier of FIG. 7.

FIGS. 7 and 8 are a perspective view and a planar cross-sectional view of a barrier 50 according to another embodiment of the present invention.

Referring to the drawing, the barrier 50 according to this embodiment includes two plates 51 and 51' formed in a similar way to the aforementioned Embodiment. Each plate 51 and 51' respectively has a plurality of protrusions 52 and 52' and junction portions 53 and 53' and are assembled together in the same way as in the aforementioned embodiment.

According to this embodiment, the junction portions 53 and 53' are formed in a rib shape and are disposed at the top and bottom of the plates 51 and 51' at predetermined intervals in a lengthwise direction of the plates 51 and 51'.

According to this embodiment of the present invention, the protrusions 52 and 52' and the junction portions 53 and 53' have substantially the same height unlike the aforementioned embodiments.

Accordingly, when the plates 51 and 51' are assembled, the protrusions 52 and 52' and the junction portions 53 and 53' on each plate can contact each other as illustrated in FIG. 8, and they are welded together by ultra welding or by laser welding, thereby forming the barrier 50.

The barrier 50 with the above structure has more strength since it is reinforced by the rib-shaped junction portions 53 and 53'.

In addition, the present invention can accomplish sufficient strength of the barrier by minimizing a poor welding, when members comprising the barrier are welded. Subsequently, since the barrier can strengthen upholding force of a unit battery, it can minimize thermal transformation of the unit battery and also, reinforce cooling efficiency in a rechargeable battery module including the unit batteries.

The rechargeable battery module can be used for motor drive of equipment requiring high power characteristics such as HEVs (Hybrid Electric Vehicles), EVs (Electric Vehicles), cordless vacuum cleaners, motorbikes, electric scooters, and so on.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery module comprising:
a plurality of unit batteries disposed apart at intervals; and
a plurality of barriers interposed in pairs between each pair of the unit batteries, each barrier including a pair of parallel plates having a plurality of protrusions extending perpendicularly from their respective plate and at least one junction portion extending perpendicularly from its respective plate and at least one junction face parallel to its respective plate;
wherein the at least one junction portion of one plate is fixed to the at least one junction face of another plate opposing the one plate,
wherein said plurality of protrusions each have a conical shape with a base and a cutaway apex area in which said cutaway apex area of said plurality of protrusions of one of said pair of parallel plates comes into direct contact with said cutaway apex area of said plurality of protrusions of another of said pair of parallel plates, said base being wider than said cutaway apex area.

2. The rechargeable battery module of claim 1, wherein the plurality of protrusions on each of a pair of the plurality of plates are arranged to face each other.

3. The rechargeable battery module of claim 1, wherein the at least one junction portion and at least one junction face of the plurality of plates are welded together.

4. The rechargeable battery module of claim 3, wherein the plurality of plates are welded together by either ultrasonic welding or laser welding.

5. The rechargeable battery module of claim 1, wherein the at least one junction portions protrude at predetermined intervals on each plate.

6. The rechargeable battery module of claim 1, wherein at least one of the plurality of protrusions or the at least one junction portions are solid.

7. The rechargeable battery module of claim 1, wherein at least one of the plurality of protrusions or the at least one junction portions are hollow.

8. The rechargeable battery module of claim 1, wherein the at least one junction portions are taller than the plurality of protrusions.

9. The rechargeable battery module of claim 1, wherein each plate has a quadrangular shape, and wherein the plurality of junction portions are formed at one end of each plate.

10. The rechargeable battery module of claim 1, wherein a holder supporting the at least one junction portion on one plate is arranged along junction faces on another plate, the holder being adapted to contact the respective junction portion.

11. The rechargeable battery module of claim 1, wherein at least one of the plurality of protrusions or the at least one junction portions has a conical shape with a cutaway apex area that is wide at the top and narrow at the bottom.

12. A rechargeable battery module comprising:
a plurality of unit batteries disposed apart at intervals; and
a plurality of barriers interposed in pairs between each pair of the unit batteries, each barrier including a pair of parallel plates having a plurality of protrusions extending perpendicularly from their respective plate and at least one junction portion extending perpendicularly from its respective plate;
wherein the at least one junction portion of one plate is fixed to the at least one junction portion of another plate opposing the one plate,
wherein said plurality of protrusions each have a conical shape with a base and a cutaway apex area in which said cutaway apex area of said plurality of protrusions of one of said pair of parallel plates comes into direct contact with said cutaway apex area of said plurality of protrusions of another of said pair of parallel plates, said base being wider than said cutaway apex area.

13. The rechargeable battery module of claim 12, wherein the at least one junction portions of one plate and the junction portions of another plate are welded together, the junction portions of the plates being closely adjacent to each other.

14. The rechargeable battery module of claim 12, wherein each junction portion includes a rib disposed at both ends of the plates with the plurality of protrusions in the middle.

15. The rechargeable battery module of claim 14, wherein each barrier includes an assembly having a pair of welded plates, the junction portions of the plates being closely adjacent to each other.

* * * * *